April 30, 1968   A. D. KOMPELIEN   3,380,796

FUEL BURNER CONTROL APPARATUS

Filed Feb. 3, 1967

*INVENTOR.*
ARLON D. KOMPELIEN
BY *Alfred N. Feldman*
ATTORNEY

United States Patent Office 3,380,796
Patented Apr. 30, 1968

3,380,796
FUEL BURNER CONTROL APPARATUS
Arlon D. Kompelien, Richfield, Minn., assignor to Honeywell Inc., Minneapolis, Minn., a corporation of Delaware
Filed Feb. 3, 1967, Ser. No. 613,903
5 Claims. (Cl. 431—68)

ABSTRACT OF THE DISCLOSURE

A fuel burner control system that utilizes a photocell responsive to a flame at the burner to control a silicon controlled rectifier to energize a relay which directly controls the power to the fuel burner. Two bias networks are provided for the silicon controlled rectifier and the voltages are combined to trigger the silicon controlled rectifier early in the applied cycle of voltage, if at all. One of the voltage divider networks utilizes a Zener diode for voltage limiting and voltage regulation.

Cross-reference to related applications

The present application is an improvement of the United States application Ser. No. 522,586 filed on Jan. 24, 1966 in the name of Robert E. Mierendorf and assigned to the assignee of the present invention.

Background of the invention

The present invention has particular utility in the control of a fuel burner that utilizes a photocell responsive to the presence or absence of flame and which includes a safety switch having a resistive heater element for tripping the safety switch in case of failure to prove out a flame in a fixed period. The claimed apparatus is a detailed improvement over the above referenced Mierendorf application wherein a silicon controlled rectifier for energizing the relay in a burner control system was disclosed. The silicon controlled rectifier has a back bias network energized by an alternating current source through the heater element of the safety switch. The circuit also utilizes a forward bias voltage network energized from the same source for supplying a forward bias to the silicon controlled rectifier which is controlled by the photocell used to sense the presence or absence of flame.

Summary of the invention

The present invention is that the forward voltage bias supply network is limited by a Zener diode. The Zener diode provides two functions. The diode clips the voltage of bias supply of the silicon controlled rectifier which in conjunction with the back bias network thereby yields a gate to cathode voltage to the silicon controlled rectifier which always reaches a maximum value early in the applied voltage cycle to trigger the silicon controlled rectifier early in the applied cycle, if at all. This allows for the use of an inexpensive relay and yet provides consistent operation of the relay. The magnitude of the voltage from the forward clipped bias supply is applied to the silicon controlled rectifier and is controlled by the photo-responsive element. Since this supply voltage is clipped prior to being applied to the photo-responsive element, it reduces the dissipation required in this element.

Description of the preferred embodiment

Figure 1:
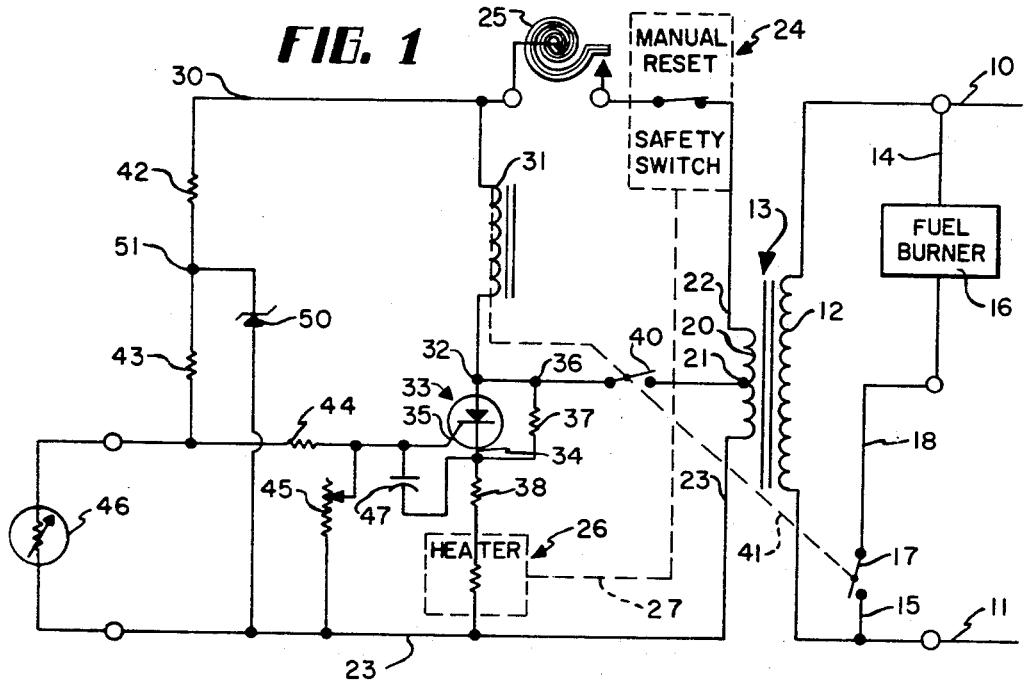
FIGURE 1 is a schematic showing of a basic form of the circuit incorporating the present invention.

In FIGURE 1, a circuit is supplied with a conventional alternating current voltage which is connected to a primary winding 12 of a transformer generally shown at 13 by a pair of conductors 10 and 11. The conductors 10 and 11 also supply potential on conductors 14 and 15 to a fuel burner 16 through the expedient of a normally open relay contact 17 and conductor 18.

The transformer 13 has a secondary winding 20 that is tapped at 21 and has output conductors 22 and 23. The secondary winding 20 is a conventional step down winding and normally supplies approximately 24 volts to the system. The conductor 22 is connected through a manual reset safety switch generally shown at 24 and then to a thermostat generally shown at 25. The manual reset safety switch 24 has coupled to it, in a heat exchange relationship, a safety switch heater means 26. The coupling is shown schematically on the drawing by the dash line 27 and indicates a conventional safety switch where the heater means 26 supplies heat to the safety switch 24 and opens the safety switch 24 in the event that the heater means 26 is supplied with a sufficient level of current for a fixed period of time. The operation of the safety switch 24 and its heater means 26 is well known in the art and its function in the circuit will become apparent after the entire circuit has been described.

The thermostat 25 is connected to a conductor 30 that in turn is connected through a control means 31 which includes a relay actuator coil. The relay or control means 31 is connected to one electrode 32 of a controlled rectifier means generally shown at 33 and which in fact is a silicon controlled rectifier. The controlled rectifier 33 has a further cathode electrode 34 and a gate means or electrode 35. The electrode 32 is connected at 36 to a resistor 37 that is in turn connected to electrode 34, thereby paralleling the silicon controlled rectifier 33. The electrode 34 is further connected to a resistor 38 that connects to the heater means 26 and the conductor 23. The control means 31 along with the resistors 37, 38, and heater means 26 form a back bias network for developing a back bias alternating current voltage across resistor 38 and heater means 26. This back bias voltage is connected in series opposition with a forward bias voltage which is developed across resistor 45, as will be described, and the sum of these voltages is connected to the gate means 35 of the silicon controlled rectifier 33.

Also connected to the electrode 32 and the junction 36 is a relay contact 40 shown in its open condition. The contact 40 is a normally open contact operated by the control means or relay 31 and is further connected mechanically at 41 to the normally open relay contact 17. It is thus obvious that the relay contacts 17 and 40 operate in unison when the control means or relay 31 is energized. The contact 40 is connected to the tap 21 of the secondary winding 20 of the transformer means 13. Upon operation of the relay 31 and the closure of the contact 40 the tap voltage is applied to the electrode 32 thereby reducing the voltage to the silicon controlled rectifier electrode. Closure of this contact also reduces the voltage applied to the resistor network of 37, 38 and 26 reducing the back bias alternating current voltage across resistor 38 and heater means 26. As a result, less forward bias voltage from the photocell circuit, as developed across resistor 45, is required to turn on the silicon controlled rectifier after the relay is closed. This insures going out on safety lockout, if flame is not detected, for a given photocell impedance that allows the relay to pull in.

Connected between the conductor 30 and the conductor 23 is another voltage bias supply means in the form of a voltage divider network made up of a fixed resistor 42 in series with a resistor 43 that in turn is in series with the parallel combination of series connected resistor 44 and potentiometer 45 and a flame responsive means 46 in the form of a cadmium sulfide photocell. The cadmium sulfide photocell is a resisitive type device that has a relatively low resistance when it is exposed to the light of a flame, and a relatively high resistance when no flame is present. Also connected to the voltage bias means or voltage divider network is a Zener diode means 50 that is connected at the junction 51 between the resistors 42 and 43, and to the conductor 23. The Zener diode means 50 is a well known type of semiconductor unit that acts as a diode in one direction and as a breakdown diode in the reverse direction. The Zener diode means 50 has a voltage regulating function that holds the voltage at junction 51 quite fixed as each applied voltage cycle is applied to the conductors 30 and 23. The exact function will be described subsequently. Connected to the potentiometer 45 is the gate means 35 thereby tying the gate means 35 through a portion of the voltage divider network to the conductor 23. Placed between electrodes 34 and the gate means 35 is a capacitor 47 that acts to suppress transients that could improperly fire the silicon control rectifier. The capacitor is optional in the present circuit. The flame responsive means or photocell 46 is placed so that it is responsive to a flame at the fuel burner 16 and operates in conjunction therewith in a conventional fashion.

Figure 2:
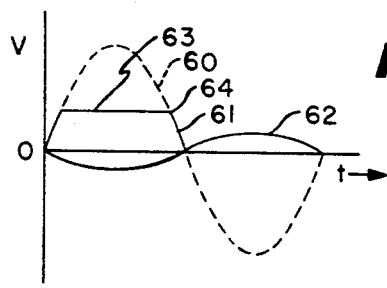
FIGURE 2 is a graphic representation of the wave form of both the forward bias and back bias voltages applied to the gate means of the silicon controlled rectifier.
Figure 3:
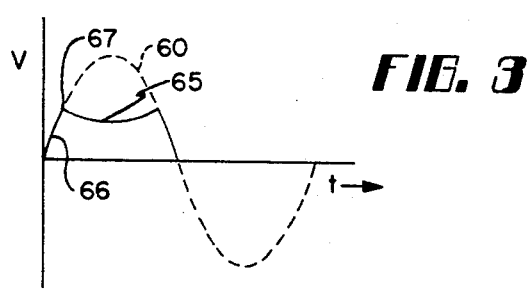
FIGURE 3 is a graphic representation of the combined wave forms that act as the effective signal to the silicon controlled rectifier.

A generalized description of the operation of the present system is believed in order prior to a description of the specific wave forms of FIGURES 2 and 3 so that these wave forms will have a meaningful significance. When a potential is applied between conductors 10 and 11 and the thermostat 25 calls for an increase in heat in the form of operation of the fuel burner 16, the thermostat 25 closes the circuit through the safety switch means 24 thereby applying the alternating current source of voltage to the conductors 30 and 23. This voltage is applied to the control means or relay 31, the silicon controlled rectifier 33 and the voltage divider network made up of the resistors 37, 38 and the heater means 26 and places the silicon controlled rectifier 33 in a condition wherein it can conduct if a sufficient gate to cathode voltage is applied at the gate means 35 during the half cycle of AC in which anode 32 is positive and cathode 34 is negative. Since the initiation of the system occurs with the burner in an unlit condition, the resistance of the flame-responsive means 46 is a substantially high resistance value. The voltage occurring between the junction 51 and conductor 23 is limited by the Zener diode means 50 after it reaches some nominal value, as determined by the Zener diode means 50. This regulated voltage is applied to the voltage divider network made up of the resistors 43, 44, and the potentiometer 45. This applies a signal to the gate means 35 of the silicon controlled rectifier 33 and if it is of sufficient magnitude causes the silicon controlled rectifier 33 to conduct thereby energizing the relay 31. The relay 31 closes the normally open contacts 40 and 17. Contact 17 energizes the fuel burner 16 and the contact 40 reduces the applied voltage to the silicon controlled rectifier 33 and its associated voltage divider network including the heater 26. This reduces the back bias voltage developed across resistor 38 and heater means 26 to reduce the required forward bias voltage, developed across resistor 45, to cause the silicon controlled rectifier to trigger each cycle. This insures the safety switch will continue heating for a given photocell resistance that may allow the burner 16 to start up.

During this time, the forward bias voltage developed across resistor 45 remains unaffected until the burner actually lights. After the burner lights, the photocell 46 decreases in resistance thereby significantly reducing the voltage developed across resistor 45 and thereby reducing the forward bias voltage applied at the gate means 35 of the silicon controlled rectifier 33. This causes the silicon controlled rectifier 33 to cease conducting thereby decreasing the value of current flowing in the heater means 26. This reduction in current in the heater means 26 reduces the heat output sufficiently to prevent the heater means 26 from opening the manual reset safety switch means 24. The relay 31 has been locked in by the closing of contact 40 and stays locked in until the thermostat 25 opens the circuit. One problem with the circuit as described, without the novel function incorporated by the present invention, is that the silicon controlled rectifier 33 is allowed or could be allowed to be fired without regard to the phase of the applied voltage anywhere between the beginning of the applied voltage cycle to the 90° point in the cycle. This causes a considerable variation in the amount of energy supplied to the relay 31 and is an undesirable variable condition. The present invention involves the utilization of the Zener diode means 50 to stabilize the triggering voltage for the silicon controlled rectifier 33 and to limit the dissipation in the photocell 46, as will be brought out in connection with FIGURES 2 and 3.

In FIGURE 2, the wave form 60 shows the phase of the voltage applied and is for phase reference only. The voltage applied to the gate circuit between electrodes 34 and 35 of the silicon controlled rectifier 33 is made up of the two voltages shown at 61 and 62. The voltage wave form 62 is the back bias voltage developed across the resistor 38 and the heater means 26. A very small back bias is thereby applied to the silicon controlled rectifier. Accompanying the back bias, shown as wave form 62, is the forward bias voltage developed across part of resistor 45, shown as wave form 61. The magnitude of this voltage is controlled by the photocell 46. The voltage of wave form 61 has the same shape as the applied wave form 60 until the voltage at 51 has reached the breakdown potential of the Zener diode means 50. At this point it becomes flat, as shown at 63 and remains flat until the voltage begins to decline near the end of the applied positive portion of the wave form 60, as shown at 64. The voltages 61 and 62 are connected in series opposition between cathode 34 and gate 35 and form the total bias in the form of a forward bias voltage and a reverse bias voltage.

In FIGURE 3, the combined voltage wave form 65 is shown. The wave form 60 is again shown as a matter of reference. It will be noted that the wave form 65 rises at 66 until the flattened or clipped part 63 of wave form 60 occurs. At this time, the wave form 65 begins to decline, as shown at 67. The wave form reverses in magnitude at a point very early in the cycle of the alternating current voltage and is applied as a bias to the gate means 35 (in reality between the gate 35 and cathode 34).

With the wave form 65 applied between the gate 35 and electrode 34, the silicon controlled rectifier 33 either fires at or before the point 67 of the wave form shown in FIGURE 3, or it does not fire during that cycle. It is possible to fire at the last peak point, however, the power is so low here the relay will not pull in and the safety switch will not trip. In this manner the firing point is caused to occur early in the applied cycle thereby insuring a substantially constant amount of energy being supplied to the relay means 31 from the silicon controlled rectifier 33. With the arrangement described the firing of the silicon controlled rectifier is very carefully controlled and is uniform from one operating time to the next.

The present invention, the addition of the Zener diode means 50, also accomplishes another function. The Zener diode means 50, by being connected at the junction 51, limits the voltage supplied to the forward voltage bias supply means which includes the photocell or flame-responsive means 46. By limiting the applied voltage supply to the photocell 46, the total dissipation that occurs in this photocell is very carefully limited. This improves the life and operation of the system.

In the present invention, it becomes apparent that the deficiencies in substituting a silicon controlled rectifier as a switching means in a burner control circuit have been eliminated by the addition of a Zener diode means to limit both the dissipation in the photocell and to provide a voltage bias curve characteristic that guarantees a uniform firing potential of the silicon controlled rectifier early in the applied alternating current voltage cycle. It becomes obvious that the present circuit could be modified in additional ways that would be well contemplated by one versed in the present art and therefore the inventor wishes to be limited in the scope of his invention only by the appended claims.

The embodiments of the invention in which an exclusive property or right is claimed are defined as follows:

1. A fuel burner control apparatus comprising: a pair of conductors adapted to be connected to an alternating current source of voltage; controlled rectifier means including gate means and two electrodes; safety switch means including heater means; electrically energizable control means including an actuator, having a first and a second condition of operation, and adapted when in said second condition of operation to energize a fuel burner; circuit means connecting said actuator between a first electrode of said controlled rectifier means and one of said conductors; circuit means connecting said heater means between a second electrode of said controlled rectifier means and other of said conductors; an impedance, circuit means connecting said impedance from said first to said second electrode of said controlled rectifier means, back bias voltage supply means connecting said heater means to said gate means to apply the voltage developed across said heater means as a back bias voltage to said gate means; forward bias voltage supply means connected to said pair of conductors and including flame responsive means adapted to respond to said fuel burner to sense the presence or absence of flame; means connecting said gate means to said forward bias voltage supply means to apply a variable forward bias voltage to said gate means; and Zener diode means connected to said forward bias voltage supply means to limit the magnitude of said forward bias voltage to thus cause said back bias voltage and said forward bias voltage to combine at said gate means into a control voltage which achieves a maximum magnitude early in the cycle of the alternating current source of voltage.

2. A fuel burner control apparatus as described in claim 1, wherein said controlled rectifier means is a silicon controlled rectifier; said control means is a relay adapted to energize said fuel burner; and said flame responsive means is a photocell adapted to respond to the presence or absence of flame at said fuel burner.

3. A fuel burner control apparatus as described in claim 2, wherein said Zener diode means is a single voltage limiting Zener diode.

4. A fuel burner control apparatus as described in claim 1, wherein said back bias voltage supply means and said forward bias voltage supply means are voltage divider means connected between said pair of terminals.

5. A fuel burner control apparatus as described in claim 3, wherein said back bias voltage supply means and said forward bias voltage supply means are voltage divider means connected between said pair of terminals.

References Cited
UNITED STATES PATENTS

| | | |
|---|---|---|
| 3,149,224 | 9/1964 | Horne et al. |
| 3,270,799 | 9/1966 | Pinckaers _____ 158—128 |
| 3,276,507 | 10/1966 | Eldridge et al. _____ 158—28 |

JAMES W. WESTHAVER, *Primary Examiner.*